United States Patent
Maslanka

(10) Patent No.: US 6,214,932 B1
(45) Date of Patent: Apr. 10, 2001

(54) CREPING ADHESIVES OBTAINED BY THE REACTION OF POLYAMIDE AND POLYVINYLALCOHOL WITH EPICHLOROHYDRIN

(75) Inventor: William Walter Maslanka, Landenberg, PA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/224,113

(22) Filed: Dec. 29, 1998

(51) Int. Cl.$^7$ ...................................................... C08L 29/04
(52) U.S. Cl. ........................... 525/58; 162/111; 162/112; 525/471; 525/420
(58) Field of Search ........................... 525/58, 417, 420; 162/111, 112

(56) References Cited

U.S. PATENT DOCUMENTS

| | | |
|---|---|---|
| 2,832,747 | 4/1958 | Jackson . |
| 2,926,154 | 2/1960 | Keim . |
| 3,086,961 | 4/1963 | House et al. . |
| 3,224,986 | 12/1965 | Butler et al. . |
| 3,922,243 | 11/1975 | Aldrich et al. . |
| 3,988,280 | 10/1976 | Aldrich et al. . |
| 4,501,640 | 2/1985 | Soerens . |
| 4,528,316 | 7/1985 | Soerens . |
| 4,684,439 | 8/1987 | Soerens . |
| 4,788,243 | 11/1988 | Soerens . |
| 5,179,150 | 1/1993 | Furman, Jr. et al. . |
| 5,338,807 | 8/1994 | Espy et al. . |
| 5,602,209 | 2/1997 | Warchol et al. . |
| 5,633,309 | 5/1997 | Warchol et al. . |
| 5,660,687 | 8/1997 | Allen et al. . |
| 5,833,806 | 11/1998 | Allen et al. . |
| 5,837,768 | 11/1998 | Warchol et al. . |
| 5,858,171 | 1/1999 | Warchol et al. . |
| 5,865,950 | 2/1999 | Vinson et al. . |
| 5,944,954 | 8/1999 | Vinson et al. . |
| 5,980,690 | 11/1999 | Warchol et al. . |

FOREIGN PATENT DOCUMENTS

| | | |
|---|---|---|
| 2572021 | 4/1986 | (FR) . |
| 3-234754 | 10/1991 | (JP) . |
| 97/44526 | 11/1997 | (WO) . |
| 98/33978 | 8/1998 | (WO) . |

OTHER PUBLICATIONS

Database WPI, Section Ch, Week 199148, Derwent Publications Ltd., London, GB; Class A14, AN 1991–350013, XP–00213362.

*Primary Examiner*—Bernard Lipman
(74) *Attorney, Agent, or Firm*—Greenblum & Bernstein, P.L.L.C.

(57) ABSTRACT

A process comprising mixing polyamide and another polymer, such as polyvinylalcohol and/or polyethyleneimine and reacting the polyamide/other polymer mixture with epichlorohydrin and the use of the reaction product as creping adhesive.

73 Claims, No Drawings

CREPING ADHESIVES OBTAINED BY THE REACTION OF POLYAMIDE AND POLYVINYLALCOHOL WITH EPICHLOROHYDRIN

BACKGROUND OF THE INVENTION

1. Field of the Invention

The present invention relates to creping adhesives and more particularly it relates to creping adhesive obtained by reacting polyamide and polyvinylalcohol with epichlorohydrin.

2. Description of the Prior Art

The creping process is commonly practiced in the manufacture of tissue and towel grades of paper. This process involves scraping the dried paper web from a drying cylinder (Yankee dryer) by the use of a creping doctor blade. The creping action imparts a fine, rippled texture to the sheet and also increases the bulk of the sheet, resulting in improved softness and absorbency. An adhesive formulation is often used to control the adherence of the paper sheet to the Yankee dryer. In this regard, fibrous webs, particularly paper webs, are conventionally subjected to the creping process in order to give them desirable textural characteristics, such as softness and bulk. The creping process typically involves applying creping adhesive-generally in the form of an aqueous solution or dispersion—to a drying surface for the web; preferably, this surface is the surface of a rotating creping cylinder, such as the apparatus known as a Yankee dryer. The web is then adhered to the indicated surface. It is subsequently dislodged from the surface with a creping device—preferably, a doctor blade. The impact of the web against the creping device ruptures some of the fiber-to-fiber bonds within the web, causing the web to wrinkle or pucker. The creping adhesive solution or dispersion can comprise one or more adhesive components, typically water-soluble polymers, and may also contain one or more release agent components as well as any other desired additives that may affect the creping process. This is known as the creping adhesive package.

U.S. Pat. No. 3,224,986 discloses a process for preparing a water-insoluble resin which comprises reacting a polyalkylene polyamine with a saturated dicarboxylic acid to produce a polyamide, then reacting the polyamide with epichlorohydrin at an epihalohydrin:polyamide mole ratio of from 0.5:1 to 8:1 adjusting the pH and reacting the resin with a water soluble polymer selected from a group which includes polyvinylalcohol having a degree of hydrolysis of 77%.

U.S. Pat. Nos. 4,501,640, 4,528,316, 4,684,439, and 4,788,243 disclose cellulosic webs creped with a creping adhesive consisting of polyvinylalcohol of molecular weight 90,000–140,000 and degree of hydrolysis of 80–90% and a polyamide-epicholorohydrin resin. The ratio of epi to secondary amide groups in the polyamide is from 0.5:1 to 8:1.

SUMMARY OF THE INVENTION

According to the present invention there is provided a process comprising mixing polyamide and another polymer, such as polyvinylalcohol and reacting the polyamide/polyvinylalcohol mixture with epihalohydrin.

Further provided according to the present invention is a process for creating cellulosic webs comprising (a) applying to a drying surface for cellulosic web the product prepared by the above process, (b) pressing the cellulosic web against the drying surface to effect adhesion of the web to the drying surface and (c) dislodging the web from the drying surface with a creping device to crepe the cellulosic web.

DETAILED DESCRIPTION OF THE INVENTION

It has been discovered that the reaction of a mixture of polyamide and another polymer, such as polyethyleneimine and/or polyvinylalcohol with epihalohydrin, such as epichlorohydrin, will result in creping adhesive having improved adhesive properties compared to physical blends of polyamide resin with polyvinylalcohol or polyvinylalcohol alone.

The preferred epihalohydrin to be used in the present invention is epichlorohydrin.

Suitable polyamides are the reaction product of $C_3$–$C_8$ dibasic acid and polyalkylene polyamine having the formula:

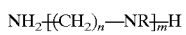

wherein
n=2–6
m=1–6 and
R=H, alkyl

Preferred polyamides are the reaction product of dibasic acids having from 5 to 7 carbon atoms and polyalkylene polyamines of the above formula where n=2, m=2 and R is hydrogen. Most preferred polyamides are the reaction product of dibasic acids having 6 carbon atoms and polyalkylene polyamines of the above formula where n=2, m=2 and R is hydrogen.

Polyamides can be prepared by the condensation of dibasic acids and polyamines. The diabasic acids can be malonic acid, succinic acid, glutaric acid, adipic acid, suberic acid and sebacic acid. The preferred acids are glutaric acid, adipic acid and suberic acid and the most preferred acids are glutaric acid and adipic acid.

The polyalkylene polyamine can be diethylenetriamine, methyl bis(3-aminopropyl)-amine, triethylenetitramine, tetraethylenepentamine, dipropylenetriamine, bishexamethylenetriamine, bis-2-hydroxyethylethylenediamine, pentaethylylenehexamine, hexaethyleneheptamine. Preferably the polyamine is diethylenetriamine, methyl bis(3-aminopropyl)-amine, triethylenetetramine, and tetraethylenepentamine. The most preferred polyamines are diethylenetriamine and methyl bis(3-aminopropyl)-amine. When the dibasic acid is adipic acid and the polyamine is diethylenetriamine the intrinsic viscosity generally can range from 0.085 to 0.095 dL/g, and when the polyamine is methyl bis(3-aminopropyl)-amine the intrinsic viscosity generally ranges from about 0.115 to 0.125 dL/g.

The other polymer mixed with the polyamide can be polyethyleneimine, preferably having a weight average molecular weight up to about 25,000 and/or polyvinylalcohol.

The polyvinylalcohol used in the present invention can be any water soluble PVA having a molecular weight sufficient to form an adhesive film having a degree of hydrolysis at least about 87%. The polyvinylalcohol suitable for use in the present invention can have a degree of hydrolysis of up to about 99%, preferably up to about 97% and most preferably up to about 89%. Suitable polyvinylalcohols preferably will have a 4% solids viscosity of at least about 25 cps, more preferably about 27 cps and most preferably about 45 cps. The PVA viscosity preferably will be up to about 60 cps and more preferably it is up to about 55 cps.

Generally, the mole ratio of polyamide to other polymer, such as polyvinylalcohol is at least about 10:90, preferably at least about 30:70, and most preferably at least about 50:50. The polyamide to polyvinylalcohol mole ratio can be up to about 90:10, preferably up to about 70:30, and most preferably up to about 50:50.

In the process of the present invention the epihalohydrin to polyamide mole ratio can be at least about 0.1:1 and more preferably at least about 0.125:1 and most preferably at least about 0.25:1. The epi:polyamide mole ratio can be up to about 0.45:1, preferably up to about 0.375:1.

The reaction of the polyamide/polyvinylalcohol mixture with epihalohydrin is generally carried out at a temperature of at least about 40, preferably at least about 50, and most preferably at least about 55° C. The reaction temperature can be up to about 75, preferably up to about 70, and most preferably up to about 65° C. Generally, the reaction of the polyamide/polyvinylalcohol mixture with epichlorohydrin is carried out at a solid concentration of at least about 10, preferably at least about 15, and most preferably at least about 20% by weight. The solid concentration can be up to about 40, preferably up to about 35, and most preferably up to about 30% by weight.

The temperatures employed for carrying out the reaction between the dicarboxylic acid and the polyalkylene polyamine may vary from about 110° C. to about 250° C. or higher at atmospheric pressure. For most purposes however temperatures between about 160° C. and 210° C. have been found satisfactory and are preferred. Where reduced pressures are employed somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid from about 0.9:1 to about 1.2:1 and preferably from about 0.92:1 to 1.14:1. However, mole ratios of from about 0.8:1 to about 1.4:1 may be used with quite satisfactory results. Mole ratios outside these ranges are generally unsatisfactory. Thus mole ratios below about 0.8:1 result in a gelled product or one having a pronounced tendency to gel while mole ratios above 1.4:1 result in low molecular weight polyamines. Such products do not produce efficient wet strength resins when reacted with epichlorohydrin.

The process of the present invention comprises mixing the polyamide and polyvinylalcohol in the desired mole ratio followed by reaction with epihalohydrin, e.g., epichlorohydrin. When the desired viscosity is reached, the resin is either diluted to low solids (e.g., about 6–7% for diethylenetriamine based polyamides) or diluted (20–25% solids) with pH adjustment (about 3–3.5) for methylbis (3-aminopropyl)amine-based polyamides.

The polyvinylalcohol used to prepare the adhesives varied depending upon the degree of hydrolysis of the polyvinylacetate starting material. The ones used in the examples included Airvol 325, 425 and 540 available from Air Products and Chemicals. The level of hydrolysis of these materials is shown in the table below.

|  | % Hydrolysis | Viscosity (cps)[a] |
|---|---|---|
| Airvol 325 | 98–98.8 | 28–32 |
| Airvol 425 | 95.5–96.5 | 27–31 |
| Airvol 540 | 87.0–89.0 | 45–55 |

[a]4% aqueous solution

The following tables and examples are given merely to illustrate the present invention and are not intended to limit same. All parts and percentages are by weight unless otherwise indicated. The examples show the adhesive properties of the polyamide/polyvinylalcohol/epichlorohydrin reaction products compared to physical blends of a polyamide resin with polyvinylalcohol and polyvinylalcohol alone.

It should be noted that the physical blends, especially those at high solids, separate on standing. Dilute solutions of blends are quite stable. The reaction products at both solids level are homogeneous.

EXAMPLE 1

Poly(adipic acid-co-diethylenetriamine)(96 g 50% solution)(reduced viscosity=0.087 dL/g) was charged to the reaction vessel and diluted with 107 cc of water. Poly (vinylalcohol)(Airvol 325)(1.1 g in 10 cc of water) was added followed by epichlorohydrin (5.8 g). The reaction mixture was heated to 60–62° C. The viscosity was monitored with Gardner-Holdt tubes. At Gardner "H" 695 cc of water was added to give a resin with a total solids of 6.5%, pH 7.8 and Brookfield viscosity of 11 cps. The Tg was −20.1° C.

EXAMPLE 2

Poly(adipic acid-co-diethylenetriamine)(74.6 g 50% solution)(reduced viscosity=0.087 dL/g) was charged to the reaction vessel and diluted with 72 cc of water. Poly (vinylalcohol) (Airvol 325)(3.3 g in 30 cc of water) was added followed by epichlorohydrin (5.8 g). The reaction mixture was heated to 56–62° C. and the viscosity monitored. At Gardner "H" the reaction was terminated by adding 588 cc of water giving a total solids of 6.8% at pH 7.8 and Brookfield viscosity of 11 cps. The Tg was 2.8° C.

EXAMPLE 3

Poly(adipic acid-co-diethylenetriamine)(53.2 g 50% solution)(reduced viscosity=0.087 dL/g) was charged to the reaction vessel and diluted with 38 cc of water. Poly (vinylalcohol)(Airvol 325)(5.5 g in 50 cc of water) was added followed by epichlorohydrin (5.8 g). The reaction mixture was heated to 51–55° C. At Gardner "H" the reaction was terminated by adding 481 cc of water to give a product having a total solids of 6.2%, pH 7.9 and Brookfield viscosity of 8 cps. The Tg was 16.3° C.

EXAMPLE 4

Poly(adipic acid-co-methylbisaminopropylamine) (102.1 g 56.3% solution)(reduced viscosity=0.084 dL/g) was charged to the reaction vessel and diluted with 139 cc of water. Poly(vinylalcohol)(Airvol 325)(1.1 g in 10 cc of water) was added followed by epichlorohydrin (5.8 g). The reaction mixture was heated to 56–69° C. and viscosity monitored. At Gardner "H" the reaction was terminated by adding 64 cc of water and adjusting the pH to 3.5 with concentrated $H_2SO_4$. The product solids were 24%, pH 3.6 and Brookfield viscosity 41 cps. The Tg was −13.5° C.

EXAMPLE 5

Poly(adipic acid-co-methylbisaminopropylamine) (79.4 g 56.3% solution)(reduced viscosity=0.084 dL/g) was charged to the reaction vessel and diluted with 97 cc of water. Poly(vinylalcohol)(Airvol 325)(3.3 g in 30 cc of water) was added followed by epichlorohydrin (5.8 g). The reaction mixture was heated to 52° C. and viscosity monitored. At Gardner "H" the reaction was terminated by adding 54 cc of water and adjusting the pH to 3.5 with concentrated sulfuric acid. The total solids were 24.5%, pH 3.6 and Brookfield viscosity 36 cps. The Tg was 25° C.

EXAMPLE 6

Poly(adipic acid-co-methylbisaminopropylamine) (56.7 g 56.3% solution)(reduced viscosity=0.084 dL/g) was charged to the reaction vessel and diluted with 55 cc of water. Poly(vinylalcohol)(Airvol 32)(5.5 g in 50 cc of water) was added followed by epichlorohydrin (5.8 g). The reaction mixture was heated to 56–61° C. and the viscosity monitored. At Gardner "H" 43 cc of water was added and the pH adjusted to 3.5 with concentrated $H_2SO_4$. The produced solids were 21.5%, pH 3.6 and Brookfield viscosity 13 cps. The Tg was 11.1° C.

Comparative Examples 1–11

The control adhesives shown in Tables 1 and 2 (C-1 to C-11) are polyamide resins alone as well as physical blends (no heat or viscosity increase) of the polyamide resins and polyvinylalcohol (Airvol 325).

TABLE 1

Adhesion Testing of Polyamide/Polyvinylalcohol/Epichlorohydrin Resins

| | | Adhesions (Kgs)[c] | |
|---|---|---|---|
| Example | Resin Description | pH 4.5 | pH 7.0 |
| 1 | Poly(adipic acid-co-DETA)/PVA[a]/EPI (90:10)[b] | 18.8 | 23.1 |
| 2 | Poly(adipic acid-co-DETA)/PVA[a]/EPI (70:30)[b] | 23.6 | 26.1 |
| 3 | Poly(adipic acid-co-DETA)/PVA[a]/EPI (50:50)[b] | 25.8 | 22.9 |
| 4 | Poly(adipic acid-co-MBAPA)/PVA[a]/EPI (90:10)[b] | 20.3 | 19.1 |
| 5 | Poly(adipic acid-co-MBAPA)/PVA[a]/EPI (70:30)[b] | 17.6 | 15.7 |
| 6 | Poly(adipic acid-co-MBAPA)/PVA[a]/EPI (50:50)[b] | 22.6 | 20.5 |
| C-1 | PA/EPI[d] alone | 20.4 | 24.1 |
| C-2 | Crepetrol 80E[e] alone | 21.4 | 22.0 |

[a]Airvol 325
[b]Polyamide:Polyvinylalcohol mole ratio
[c] Measured by adhesive test developed by Hercules incorporated comprising applying candidate adhesives to a heated platen (250° F.) and pressing a standard test paper (hardwood/sofwood) blend, 25–40 lb/ream basis weight) against the treated surface (10 kg force). The force required to pull the sheet away from the surface is determined and recorded.
[d]Low molecular weight polyamide partially crosslinked with epichlorohydrin.
[e]Polyamide-epi resin available from Hercules Incorporated.

TABLE 2

Physical Blends of Polyamide Resins and Polyvinylalcohol

| | Polyamide | PA/PVA | Adhesion (Kgs) | |
|---|---|---|---|---|
| Designation | Resin | Mole Ratio | pH 4.0 | pH 7.0 |
| C-3 | PA/EPI | 90:10 | 18.2 | 18.8 |
| C-4 | " | 70:30 | 20.0 | 22.5 |
| C-5 | " | 50:50 | 19.3 | 24.5 |
| C-6 | Crepetrol 80E | 90:10 | 19.2 | 16.6 |
| C-7 | " | 70:30 | 17.1 | 18.1 |
| C-8 | " | 50:50 | 26.5 | 23.2 |
| C-9 | PA/EPI Alone | — | 20.5 | 23.9 |
| C-10 | Crepetrol 80E Alone | — | 16.9 | 14.1 |
| C-11 | PVA (Airvol 325) Alone | — | 4.8 | 4.0 |

Adhesion test conditions:
250° F. Platten temperature
10 KG Compression force

The adhesion data in Tables 1 and 2 show good adhesive performance relative to PA/EPI/Crepetrol 80E/polyvinylalcohol.

TABLE 3

Reaction of Polyamide, Polyvinylalcohol and Epichlorohydrin

| Ex-ample | Polyamide Type | Wt | Moles | Polyvinylalcohol Type | Weight | Moles | Epichlorohydrin Weight | Moles | Reaction Solids (%) | Temp (° C.) | Terminal Visc.[c] | Total Solids (%) | pH | Brookfield Viscosity[f] (cps) | $T_g$[g] (°) |
|---|---|---|---|---|---|---|---|---|---|---|---|---|---|---|---|
| 1 | [a] | 48.0 g | 0.225 | Airvol 325 | 1.1 g[b] | 0.025 | 5.8 g | 0.0625 | 25.0 | 57–61 | H | 6.5 | 7.8 | 11 | −20.1 |
| 2 | [a] | 37.3 g | 0.175 | " | 3.3 g | 0.075 | 5.8 g | 0.0625 | 25.0 | 57–62 | H | 6.8 | 7.8 | 11 | +2.8 |
| 3 | [a] | 26.7 g | 0.125 | " | 5.5 g | 0.125 | 5.8 g | 0.0625 | 25.0 | 55–51 | H | 6.2 | 7.9 | 8 | +16.3 |
| 4 | [d] | 57.5 g | 0.225 | " | 1.1 g | 0.025 | 5.8 g | 0.0625 | 25.0 | 62–69 | H | 24.0 | 3.6 | 41 | −13.5 |
| 5 | [d] | 44.7 g | 0.175 | " | 3.3 g | 0.075 | 5.8 g | 0.0625 | 25.0 | 52 | H | 24.5 | 3.6 | 36 | +2.5 |
| 6 | [d] | 31.9 g | 0.125 | " | 5.5 g | 0.125 | 5.8 g | 0.0625 | 25.0 | 61–56 | H | 21.5[e] | 3.6 | 13 | +11.1 |

[a]Poly(adipic acid-co-DETA) IV = 0.079 dL/g (1MNH$_4$Cl, 2%, 25° C.)
[b]Added as 10% solution
[c]Gardner-Holdt viscosity
[d]Poly(adipic acid-co-MBAPA) IV = 0.076 dL/g (1MNH$_4$Cl, 2%, 25° C.)
[e]Some settling observed — filtered
[f]#1 spindle, 60 rpm, 25° C.
[g]Determined by ASTM E-1356 test

EXAMPLES 7–18 AND COMPARATIVE EXAMPLES 12–27

The procedures used in these examples were the same as in Examples 1–6 and Comparative Examples 1–11, respectively, except that Airvol 425 and Airvol 540 PVA were used herein.

Reaction conditions are summarized in Tables 8 and 9.

Adhesion results are summarized in Tables 4 to 7.

TABLE 4

Adhesion Testing of Polyamide/Polyvinylalcohol/Epichlorohydrin Resins

| Example | Resin Description | Adhesion (Kgs) pH 7.0 |
|---|---|---|
| 7 | Poly(adipic acid-co-DETA)/PVA[a]/EPI (90:10)[c] | 24.0 |
| 8 | Poly(adipic acid-co-DETA)/PVA[a]/EPI (70:30) | 23.4 |
| 9 | Poly(adipic acid-co-DETA)/PVA[a]/EPI (50:50) | 21.4 |
| 10 | Poly(adipic acid-co-DETA)/PVA[b]/EPI (90:10) | 29.0 |
| 11 | Poly(adipic acid-co-DETA)/PVA[b]/EPI (70:30) | 27.0 |
| 12 | Poly(adipic acid-co-DETA)/PVA[b]/EPI (50:50) | 34.7 |
| C-12 | PA/EPI Alone | 18.9 |

[a]Airvol 425
[b]Airvol 540
[c] Polyamide:Polyvinylalcohol mole ratio

TABLE 5

Physical Blends of Polyamide Resins and Polyvinylalcohol

| Example | Polyamide Resin | PA/PVA Mole Ratio | Adhesion (Kgs) pH 7.0 |
|---|---|---|---|
| C-13 | PA/EPI | 90:10[a] | 24.0 |
| C-14 | " | 70:30[a] | 31.0 |
| C-15 | " | 50:50[a] | 29.0 |
| C-16 | " | 90:10[b] | 20.8 |
| C-17 | " | 70:30[b] | 41.1 |
| C-18 | " | 50:50[b] | 40.9 |
| C-19 | PA/EPI Alone | — | 18.9 |

[a]Airvol 425
[b]Airvol 540

TABLE 6

Adhesive Testing of Polyamide/Polyvinylalcohol/Epichlorohydrin Resin

| Example | Resin Description | Adhesion (Kgs) pH 7.0 |
|---|---|---|
| 13 | Poly(adipic acid-co-MBAPA)/PVA[a]/EPI (90-10)[c] | 23.0 |
| 14 | Poly(adipic acid-co-MBAPA)/PVA[a]/EPI (70-30) | 21.5 |
| 15 | Poly(adipic acid-co-MBAPA)/PVA[a]/EPI (50-50) | 23.6 |
| 16 | Poly(adipic acid-co-MBAPA)/PVA[b]/EPI (90-10) | 23.4 |
| 17 | Poly(adipic acid-co-MBAPA)/PVA[b]/EPI (70-30) | 27.8 |
| 18 | Poly(adipic acid-co-MBAPA)/PVA[b]/EPI (50-50) | 23.5 |
| C-20 | Crepetrol 80E Alone | 18.2 |

[a]Airvol 425
[b]Airvol 540
[c] Polyamide:Polyvinylalcohol mole ratio

TABLE 7

Physical Blends of Polyamide Resins and Polyvinylalcohol

| Example | Polyamide Resin | PA/PVA Mole Ratio | Adhesion (Kgs) pH 7.0 |
|---|---|---|---|
| C-21 | Crepetrol 80E | 90:10[a] | 25.8 |
| C-22 | " | 70:30[a] | 33.6 |
| C-23 | " | 50:50[a] | 34.6 |
| C-24 | " | 90:10[b] | 21.8 |
| C-25 | " | 70:30[b] | 25.0 |
| C-26 | " | 50:50[b] | 26.6 |
| C-27 | Crepetrol 80E Alone | — | 18.2 |

[a]Airvol 425
[b]Airvol 540

TABLE 8

Reaction of Polyamide, Polyvinylalcohol and Epichlorohydrin

| Ex- ample | Polyamide | | | Polyvinylalcohol | | | Epichlorohydrin | | Reaction Solids (%) | Temp (° C.) | Terminal Visc. | Total Solids (%) | pH | Brookfield Viscosity (cps) | Tg (°) |
|---|---|---|---|---|---|---|---|---|---|---|---|---|---|---|---|
| | Type | Wt | Moles | Type | Weight | Moles | Weight | Moles | | | | | | | |
| 7 | (a) | 48.0 g | 0.225 | Airvol 425 | 1.1 g | 0.025 | 5.8 g | 0.0625 | 25.0 | 62–60 | L | 6.2 | 8.6 | 11 | 45.2 |
| 8 | (a) | 37.3 g | 0.175 | " | 3.3 g | 0.075 | 5.8 g | 0.0625 | 25.0 | 63–67 | L | 6.3 | 8.6 | 12 | 41.8 |
| 9 | (a) | 53.3 g | 0.25 | " | 11.0 g | 0.125 | 11.6 g | 0.125 | 25.0 | 53 | L+ | 6.3 | 8.5 | 8 | 47.8 |
| 10 | (a) | 48.0 g | 0.225 | Airvol 540 | 1.1 g | 0.025 | 5.8 g | 0.0625 | 25.0 | 69 | L | 6.3 | 8.0 | 13 | 21.6 |
| 11 | (a) | 37.3 g | 0.175 | " | 3.3 g | 0.075 | 5.8 g | 0.0625 | 25.0 | 63 | L | 6.0 | 9.1 | 13 | 55.5 |
| 12 | (a) | 53.3 g | 0.25 | " | 11.0 g | 0.125 | 11.6 g | 0.125 | 25.0 | 55 | L+ | 6.3 | 8.7 | 10 | 55.0 |

(a)Poly(adipic acid-co-DETA) IV = 0.079 dL/g (1M NH$_4$Cl, 2%, 25° C.)

TABLE 9

Reaction of Polyamide, Polyvinylalcohol and Epichlorohydrin

| Ex- ample | Polyamide | | | Polyvinylalcohol | | | Epichlorohydrin | | Reaction Solids (%) | Temp (° C.) | Terminal Visc. | Total Solids (%) | pH | Brookfield Viscosity (cps) | Tg (°) |
|---|---|---|---|---|---|---|---|---|---|---|---|---|---|---|---|
| | Type | Wt | Moles | Type | Weight | Moles | Weight | Moles | | | | | | | |
| 13 | (a) | 57.5 g | 0.225 | Airvol 425 | 1.1 g | 0.025 | 5.8 g | 0.0625 | 25.0 | 55 | H+ | 23.0 | 3.5 | 153 | 27.4 |
| 14 | (a) | 44.7 g | 0.175 | " | 3.3 g | 0.075 | 5.8 g | 0.0625 | 25.0 | 58–50 | H | 21.6 | 3.5 | 42 | 23.3 |
| 15 | (a) | 63.9 g | 0.250 | " | 11.0 g | 0.125 | 5.8 g | 0.0625 | 25.0 | 44–47 | H+ | 21.1 | 3.6 | 22 | 18.1 |
| 16 | (d) | 57.5 g | 0.225 | Airvol 540 | 1.1 g | 0.025 | 5.8 g | 0.0625 | 25.0 | 55–53 | H+ | 23.0 | 3.5 | 93 | 18.7 |
| 17 | (d) | 44.7 g | 0.175 | " | 3.3 g | 0.075 | 5.8 g | 0.0625 | 25.0 | 54–53 | H+ | 23.1 | 3.4 | 49 | 18.3 |
| 18 | (d) | 63.4 g | 0.250 | " | 11.0 g | 0.125 | 11.6 g | 0.0625 | 25.0 | 45–44 | I+ | 22.5 | 3.5 | 37 | 0.7 |

(a)Poly(adipic acid-co-DETA) IV = 0.079 dL/g (1M NH$_4$Cl, 2%, 25° C.)
(d)Poly(adipic acid-co-MBAPA) IV = 0.076 dL/g (1M NH$_4$Cl, 2%, 25° C.)

What is claimed is:

1. A composition comprising the water soluble reaction product of (a) a mixture of polyamide and at least one other polymer at least one of polyvinylalcohol and low molecular weight polyethyleneimine and (b) epihalohydrin, and said epihalohydrin and said polyamide being present in an epihalohydrin:polyamide mole ratio of up to about 0.45:1.

2. The composition of claim 1 wherein the epihalohydrin is epichlorohydrin.

3. The composition of claim 2 wherein the other polymer is polyethyleneimine having a weight average molecular weight up to about 25,000.

4. The composition of claim 2 wherein the other polymer is polyvinylalcohol.

5. The composition of claim 4 wherein the polyamide is the reaction product of $C_5$–$C_8$ dibasic acid and polyalkylene polyamine having the formula:

$$NH_2\text{---}[(CH_2)_n\text{---}NR]_m\text{---}H$$

wherein
n=2–6
m=1–6 and
R=H, alkyl.

6. The composition of claim 4 wherein the polyvinylalcohol has a 4 weight percent solution viscosity of at least about 25 cps and a degree of hydrolysis of at least about 87%.

7. The composition of claim 4 wherein the polyvinylalcohol has a 4 weight percent solution viscosity of up to about 60 cps and a degree of hydrolysis of up to about 99%.

8. The composition of claim 4 wherein the mole ratio of polyamide:polyvinylalcohol is at least about 10:90.

9. The composition of claim 4 wherein the mole ratio of polyamide:polyvinylalcohol is up to about 90:10.

10. The composition of claim 4 wherein the epihalohydrin:polyamide mole ratio is at least about 0.1:1.

11. The composition of claim 4 wherein the polyamide is the reaction product of dibasic acid comprising malonic acid, succinic acid, glutaric acid, adipic acid, suberic acid or sebacic acid, and polyalkylene polyamine comprising diethylenetriamine, methylbisaminopropylamine, triethylenetetramine, tetraethylenepentamine, dipropylenetriamine, bishexamethylenetriamine, bis-2-hydroxyethylethylenediamine, pentaethylylenehexamine, or hexaethyleneheptamine.

12. The composition of claim 5 wherein the polyvinylalcohol has a 4 weight percent solution viscosity of from about 25 to about 65 cps and a degree of hydrolysis of from about 87 to about 99%, the mole ratio of polyamide:polyvinylalcohol is from about 10:90 to about 90:10 and the epihalohydrin:polyamide mole ratio is from about 0.1:1 to about 0.45:1.

13. The composition of claim 12 wherein the dibasic acid has from 5 to 7 carbon atoms, n=2, m=2 and R is H.

14. The composition of claim 12 wherein the polyvinylalcohol has a 4 weight percent solution viscosity of at least about 27 cps.

15. The composition of claim 12 wherein the polyvinylalcohol has a 4 weight percent solution viscosity of up to about 55 cps and a degree of hydrolysis of up to about 97%.

16. The composition of claim 12 wherein the mole ratio of polyamide:polyvinylalcohol is at least about 30:70.

17. The composition of claim 12 wherein the mole ratio of polyamide:polyvinylalcohol is up to about 70:30.

18. The composition of claim 12 wherein the epichlorohydrin:polyamide mole ratio is at least about 0.125:1.

19. The composition of claim 12 wherein the epichlorohydrin:polyamide mole ratio is up to about 0.375:1.

20. The composition of claim 12 wherein the polyamide is the reaction product of dibasic acid comprising glutaric acid, adipic acid or suberic acid, and polyalkylene polyamine comprising diethylenetriamine, methylbisaminopropylamine, triethylenetetramine, or tetraethylenepentamine.

21. The composition of claim 13 wherein the polyvinylalcohol has a 4 weight percent solution viscosity of at least about 27 cps, the mole ratio of polyamide:polyvinylalcohol is from about 30:70 to about 70:30 and the epichlorohydrin:polyamide mole ratio is from about 0.125:1 to about 0.375:1.

22. The composition of claim 21 wherein the dibasic acid has 6 carbon atoms.

23. The composition of claim 21 wherein the polyvinylalcohol has a 4 weight percent solution viscosity of at least about 45 cps.

24. The composition of claim 21 wherein the polyvinylalcohol has a degree of hydrolysis of up to about 89%.

25. The composition of claim 21 wherein the mole ratio of polyamide:polyvinylalcohol is about 50:50.

26. The composition of claim 21 wherein the epichlorohydrin:polyamide mole ratio is at least about 0.25:1.

27. The composition of claim 21 wherein the polyamide is the reaction product of dibasic acid comprising glutaric acid or adipic acid, and polyalkylene polyamine comprising diethylenetriamine or methylbisaminopropylamine.

28. The composition of claim 22 wherein the polyvinylalcohol has a 4 weight percent solution viscosity of at least about 45 cps and a degree of hydrolysis of up to about 89%, the mole ratio of polyamide:polyvinylalcohol is about 50:50 and the epichlorohydrin:polyamide mole ratio is at least about 0.25:1.

29. A process of forming a water soluble reaction product comprising
    (a) mixing polyamide and at least one other polymer comprising polyvinylalcohol and low molecular weight polyethyleneimine, and
    (b) reacting the polyamide/other polymer mixture with epihalohydrin, the epihalohydrin and the polyamide being present in an epihalohydrin:polyamide mole ratio of up to about 0.45:1.

30. The process of claim 29 wherein the epihalohydrin is epichlorohydrin.

31. The process of claim 30 wherein the other polymer is polyethyleneimine having a weight average molecular weight up to about 25,000.

32. The process of claim 30 wherein the other polymer is polyvinylalcohol.

33. The process of claim 32 wherein the polyamide is the reaction product of $C_5$–$C_8$ dibasic acid and polyalkylene polyamine having the formula:

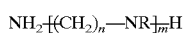

wherein
n=2–6
m=1–6 and
R=H, alkyl.

34. The process of claim 32 wherein the polyvinylalcohol has a 4 weight percent solution viscosity of at least about 25 cps and a degree of hydrolysis of at least about 87%.

35. The process of claim 32 wherein the polyvinylalcohol has a 4 weight percent solution viscosity of up to about 60 cps and a degree of hydrolysis of up to about 99%.

36. The process of claim 32 wherein the mole ratio of polyamide:polyvinylalcohol is at least about 10:90.

37. The process of claim 32 wherein the mole ratio of polyamide:polyvinylalcohol is up to about 90:10.

38. The process of claim 32 wherein the epihalohydrin:polyamide mole ratio is at least about 0.1:1.

39. The process of claim 32 wherein the polyamide is the reaction product of dibasic acid comprising malonic acid, succinic acid, glutaric acid, adipic acid, suberic acid or sebacic acid, and polyalkylene polyamine diethylenetriamine, methylbisaminopropylamine, triethylenetetramine, tetraethylenepentamine, dipropylenetriamine, bishexamethylenetriamine, bis-2-hydroxyethylethylenediamine, pentaethylylenehexamine, or hexaethyleneheptamine.

40. The process of claim 32 wherein the step (b) reaction is carried out at a temperature of at least about 40° C.

41. The process of claim 32 wherein the step (b) reaction is carried out at a temperature of up to about 75° C.

42. The process of claim 32 wherein the step (b) reaction is carried out at a solids concentration of at least about 10% by weight.

43. The process of claim 32 wherein the step (b) reaction is carried out a solids concentration of up to about 40% by weight.

44. The process of claim 33 wherein the polyvinylalcohol has a 4 weight percent solution viscosity of from about 25 to about 65 cps and a degree of hydrolysis of from about 87 to about 99%, the mole ratio of polyamide:polyvinylalcohol is from about 10:90 to about 90:10, the epihalohydrin:polyamide mole ratio is from about 0.1:1 to about 0.45:1, the step (b) reaction is carried out at a temperature of from about 40 to about 75° C. and a solids concentration of from about 10 to about 40 weight percent.

45. The process of claim 44 wherein the dibasic acid has from 5 to 7 carbon atoms, n=2, m=2 and R is H.

46. The process of claim 44 wherein the polyvinylalcohol has a 4 weight percent solution viscosity of at least about 27 cps.

47. The process of claim 44 wherein the polyvinylalcohol has a 4 weight percent solution viscosity of up to about 55 cps and a degree of hydrolysis of up to about 97%.

48. The process of claim 44 wherein the mole ratio of polyamide:polyvinylalcohol is at least about 30:70.

49. The process of claim 44 wherein the mole ratio of polyamide:polyvinylalcohol is up to about 70:30.

50. The process of claim 44 wherein the epichlorohydrin:polyamide mole ratio is at least about 0.125:1.

51. The process of claim 44 wherein the epichlorohydrin:polyamide mole ratio is up to about 0.375:1.

52. The process of claim 44 wherein the step (b) reaction is carried out at a temperature of at least about 50° C.

53. The process of claim 44 wherein the step (b) reaction is carried out at a temperature of up to about 70° C.

54. The process of claim 44 wherein the step (b) reaction is carried out at a solids concentration of at least about 15% by weight.

55. The process of claim 44 wherein the step (b) reaction is carried out at a solids concentration of up to about 35% by weight.

56. The process of claim 44 wherein the polyamide is the reaction product dibasic acid comprising glutaric acid, adipic acid or suberic acid, and polyalkylene polyamine diethylenetriamine, methylbisaminopropylamine, triethylenetetramine, or tetraethylenepentamine.

57. The process of claim 45 wherein the polyvinylalcohol has a 4 weight percent solution viscosity of at least about 27 cps, the mole ratio of polyamide:polyvinylalcohol is from about 30:70 to about 70:30, the epichlorohydrin:polyamide mole ratio is from about 0.125:1 to about 0.375:1, the step (b) reaction is carried out at a temperature of from about 50 to about 70° C. and at a solids concentration of from about 35% by weight.

58. The process of claim 57 wherein the dibasic and has 6 carbon atoms.

59. The process of claim 57 wherein the polyvinylalcohol has a 4 weight percent solution viscosity of at least about 45 cps.

60. The process of claim 57 wherein the polyvinylalcohol has a degree of hydrolysis of up to about 89%.

61. The process of claim 57 wherein the mole ratio of polyamide:polyvinylalcohol is about 50:50.

62. The process of claim 57 wherein the epichlorohydrin:polyamide mole ratio is at least about 0.25:1.

63. The process of claim 57 wherein the step (b) reaction is carried out at a temperature of least about 55° C.

64. The process of claim 57 wherein the step (b) reaction is carried out at a temperature of up to about 65° C.

65. The process of claim 57 wherein the step (b) reaction is carried out at a solid concentration of at least about 20% by weight.

66. The process of claim 57 wherein the step (b) reaction is carried out at a solid concentration of up to about 30% by weight.

67. The process of claim 57 wherein the polyamide is the reaction product of dibasic acid comprising glutaric acid and adipic acid, and polyalkylene polyamine selected from the group consisting of diethylenetriamine and methylbisaminopropylamine.

68. The process of claim 58 wherein the polyvinylalcohol has a 4 weight percent solution viscosity of at least 45 cps and a degree of hydrolysis of up to about 89%, the mole ratio of polyamide:polyvinylalcohol is about 50:50, the epichlorohydrin:polyamide mole ratio is at least about 0.25:1, the step (b) reaction is carried out at a temperature of from about 55 to about 65° C. and at least a solids concentration of about 20 to about 30% by weight.

69. A process for creping cellulose webs comprising:
(a) applying to a drying surface for cellulosic web the product prepared by the composition of claim 1,
(b) pressing a cellulosic web against the drying surface to effect adhesion of the web to the drying surface, and
(c) dislodging the web from the drying surface with a creping device to crepe the cellulosic web.

70. A process for creping cellulose webs comprising:
(a) applying to a drying surface for cellulosic web the product prepared by the composition of claim 4,
(b) pressing a cellulosic web against the drying surface to effect adhesion of the web to the drying surface, and
(c) dislodging the web from the drying surface with a creping device to crepe the cellulosic web.

71. A composition for creping cellulose webs comprising:
(a) applying to a drying surface for cellulosic web the product prepared by the composition of claim 12,
(b) pressing a cellulosic web against the drying surface to effect adhesion of the web to the drying surface, and
(c) dislodging the web from the drying surface with a creping device to crepe the cellulosic web.

72. A process for creping cellulose webs comprising:
(a) applying to a drying surface for cellulosic web the product prepared by the process of claim 21,
(b) pressing a cellulosic web against the drying surface to effect adhesion of the web to the drying surface, and
(c) dislodging the web from the drying surface with a creping device to crepe the cellulosic web.

73. A composition for creping cellulose webs comprising:
(a) applying to a drying surface for cellulosic web the product prepared by the process of claim 28,
(b) pressing a cellulosic web against the drying surface to effect adhesion of the web to the drying surface, and
(c) dislodging the web from the drying surface with a creping device to crepe the cellulosic web.

* * * * *